United States Patent [19]

Schulz Van Endert

[11] Patent Number: 4,758,650
[45] Date of Patent: Jul. 19, 1988

[54] PROCESS AND APPARATUS FOR PRODUCING HIGH MOLECULAR WEIGHT POLYESTERS

[75] Inventor: Eike Schulz Van Endert, Berlin, Fed. Rep. of Germany

[73] Assignee: Karl Fischer Industrieanlagen GmbH, Fed. Rep. of Germany

[21] Appl. No.: 42,933

[22] Filed: Apr. 27, 1987

[30] Foreign Application Priority Data

Apr. 29, 1986 [EP] European Pat. Off. ........ 86730071.7

[51] Int. Cl.[4] ............................................. C08G 63/02
[52] U.S. Cl. .............................. 528/308.3; 528/308.5; 528/483; 528/501
[58] Field of Search .................. 528/308.3, 308.5, 483, 528/501

[56] References Cited

U.S. PATENT DOCUMENTS 3,689,461 9/1972 Balint et al. ...................... 528/308.3
3,819,585 6/1974 Funk et al. ........................ 528/308.5
4,382,139 5/1983 Kapteina et al. ................. 528/308.3

Primary Examiner—John Kight
Assistant Examiner—S. A. Acquah
Attorney, Agent, or Firm—Basile and Hanlon

[57] ABSTRACT

A process and an apparatus for the production of high molecular weight linear polyester is proposed, in which a pumpable material is produced in particular terephthalic acid and an alkaline diol which is esterified in a two or multi-stage reactor arrangement and is subsequently condensed in vacuo in at least one vacuum reactor. The waste heat of the esterification reactor arrangement is used for producing the vacuum in the vacuum reactors. The water for condensing the steam is also obtained from the process steam.

9 Claims, 3 Drawing Sheets

PROCESS AND APPARATUS FOR PRODUCING HIGH MOLECULAR WEIGHT POLYESTERS

BACKGROUND OF THE INVENTION

1. Field of the Invention

The invention relates to a process for producing high molecular weight polyesters, such polyethylene terephthalate, polybutylene terephthalate, as well as their copolymers, as well as to an apparatus for performing the process. More specifically, the invention relates to a process for producing high molecular weight polyesters in which a pumpable material is produced from terephthalic acid and an alkaline diol esterefied in a multi-stage reactor arrangement in which waste heat is used to produce the vacuum in at least one vacuum reactor.

2. Description of the Prior Art

A known process for the continuous production of polyethylene terephthalate (PETP) based on terephthalic acid and ethylene glycol will be described relative to the apparatus according to FIG. 1. Terephthalic acid and ethylene glycol are introduced into a mixing device 1 in a ratio suitable for esterification, pumped by means of a pump 2 into the esterification reactor 3 and converted at 80 to 90% into bis (2-hydroxyethyl)-terephthalate at temperatures between 240° and 280° C. and pressure between 0.1 and 8 bar. The water obtained from the kinetics of the reaction in the form of steam is passed together with the liberated glycol vapour into the separating column 4, the purified water vapour being drawn off in the upper part of column 4 and condensed in a condenser 6. The condensate is collected in a container 7 and supplied via a pump again, partly as a return flow or reflux, to the separating column 4, whilst the reaction water drains out of container 7. The reaction product passes into a further reactor 8, in which the esterification reaction is largely concluded. Reaction water vapour and liberated glycol are totally condensed and supplied to a recovery means. The esterification product passes into a first vacuum reactor 9 constructed as a degassing vessel, which contains heating coils to compensate the enthalpy loss of the precondensate resulting from the evaporation of the glycol, the oligomers, and the remaining water formed during expansion. Precondensation is continued in a second vacuum reactor 10, whose stirring cascade favourably influences polymer formation and therefore, reaction glycol expulsion.

Final condensation takes place in a third vacuum reactor 11, which can be constructed as a rotating disk reactor. The finished polyester melt is removed by a pump 12 at the reactor outlet and is supplied to a spinning means. With each vacuum reactor 9, 10, 11 is associated a vacuum unit 5, 27, 14 for producing the different vacua in the range 100 to 0.1 mbar. Jet pumps 12, 13 of vacuum units 5, 27 are, e.g., constructed as ethylene glycol - liquid pumps, the glycol 15 leaving jet pumps 12, 13 to flow in the circuit and from time to time being worked up again in a recovery means. Between the vacuum reactors 9, 10, 11 and jet pumps 12, 13, 14 is provided a spray condenser 16, in which the glycol vapours and oligomers from the particular vacuum reactor are deposited. The cooling fluid is glycol, which is injected by means of nozzles. The deposited glycol is also supplied to a collecting container. The vacuum unit 14 producing the vacuum in the final condensation reactor 11 is constructed in a multistage manner; i.e. jet pump 17 is connected to spray condenser 16, which can also be in multistage form and which is preferably constructed as a steam jet pump, which 17a is connected to a direct contact condenser 18, whose outlet issues into a second jet pump 19, which once again leads into a second direct contact condenser 20, to whose outlet is connected a third jet pump 21. Jet pumps 17, 19, 21 are supplied with live steam 22, whilst contact condensers 18, 20 operate with cooling water 23, which is partly obtained from the condensate of condensers 18, 20 and jet pump 21, but partly has to be supplied as fresh water to avoid concentration in the circuit. The condensate is collected in container 24 and is supplied by means of a pump 25 to a heat exchanger 26 or the like. The overflow from barometric container 24, enriched with glycol, aldehydes and other decomposition products, passes into the waste water system.

It is alo possible to use other means as vacuum units, e.g. mechanical vacuum pump means with rotary pump or glycol vapour and liquid jet pumps, provided that they take account the specific requirements of the product it is also possible to correctly construct the upstream devices for the condensation and separation of the reaction vapours and oligomers.

The known processes are inter alia characterized by a relatively poor thermal efficiency of approximately 30%. In addition, in the known processes, undesired side flows occur to a considerable extent and lead to waste water pollution or increased contamination of the recovery means or waste water treatment. In addition, all the known vacuum means must be operated from the outside by additional energy sources and involve high maintenance and capital costs.

The problem of the invention is to improve the known processes for the production of high molecular weight polyesters, in that the overall efficiency is increased, i.e. the plant is operated economically through reduced use of primary energy. In addition, waste water pollution is to be minimized and operational reliability improved. This problem is inventively solved by the characterising features of the main claim.

SUMMARY OF THE INVENTION

It has been found that the process steam from the esterification reaction stage can be used for operating steam vacuum pumps with good operating reliability, so that efficiency is increased. After degassing, the process water obtained from the process steam has also proved suitable for condensing the driving flow of the jet pumps. Compared with other processes, the invention leads to an approximately 60% reduced waste water quantity, due to the fact that the complete waste requirements of the system are satisfied by the process, i.e. no additional, treated water is required for avoiding concentration within the cooling circuit. As a result of the inventive process, it has been possible to reduce the overall chemical and biological waste water pollution by approximately 40%. A further advantage of the invention is that the diameters of the narrowest cross-sections of the venturi tubes of the jet pumps can be made larger, because the process steam is present with a pressure of 2 to 3 bar overpressure. Therefore, the trouble free operating period of the check pumps is considerably increased, so that there is no need for the otherwise necessary double arrangement of vacuum pumps.

BRIEF DESCRIPTION OF THE DRAWING

The invention is described in greater detail hereinafter relative to an apparatus shown in the drawings, wherein.

DETAILED DESCRIPTION OF THE PREFERRED EMBODIMENT

Figure 1:
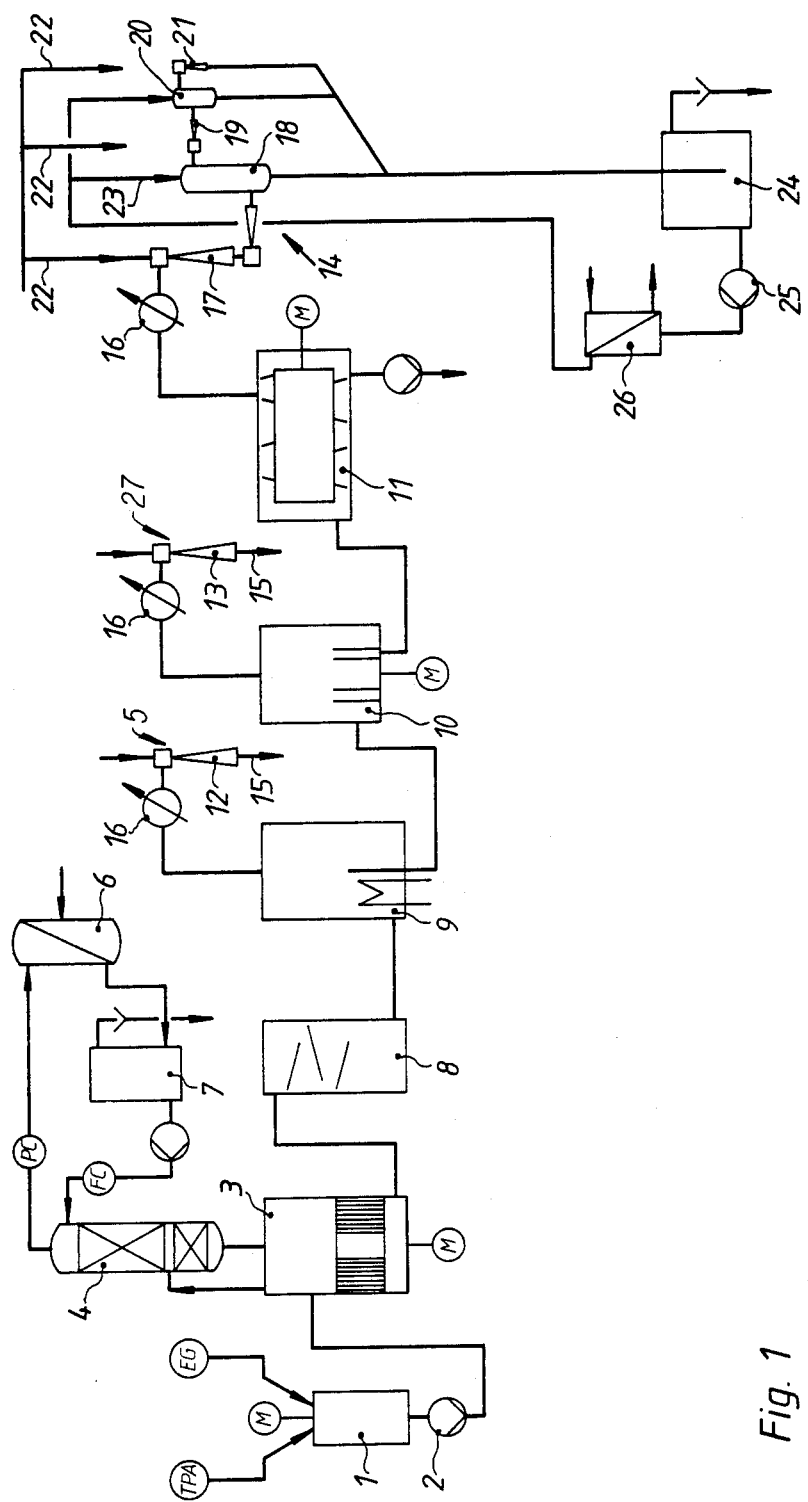
FIG. 1 represents an apparatus for performing the process for the continuous production of high molecular weight polyesters according to the prior art.
Figure 2:
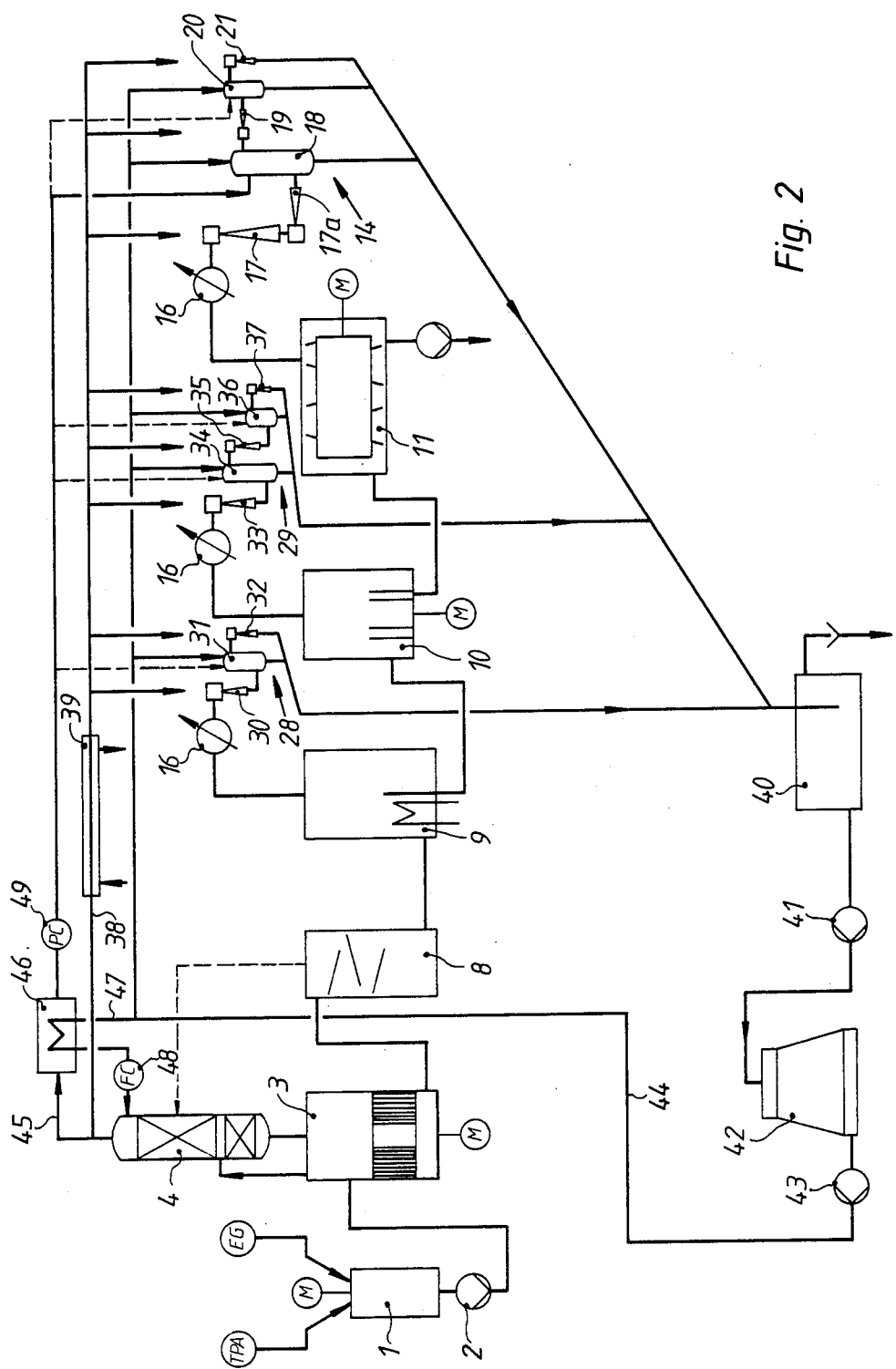
FIG. 2 represents a diagrammatic representation of the apparatus according to the invention.

In the diagrammatic representation of the inventive apparatus shown in FIG. 2, the same references as in FIG. 1 are used for the same parts. The vacuum parts 28, 29 producing the vacuum in vacuum reactors 9, 10 for precondensation purposes and the vacuum unit 14 associated with vacuum reactor 11 for final condensation purposes are constructed as steam jet units. Vacuum unit 28 associated with vacuum reactor 9 is constructed in a two-stage manner and comprises a steam jet pump 30 connected to a spray condenser 16, a direct contact condenser 31 connected thereto and a steam jet pump 32 connected to the outlet of contact condenser 31.

Vacuum unit 29 of the second vacuum reactor 10 is in a three-stage form and has a jet pump 33, a direct contact condenser 34 connected thereto, a further stage comprising jet pump 35 and direct contact condenser 36 and a further jet pump 37.

The water vapour or steam produced by the esterification of terephthalic acid and ethylene glycol in esterification reactor 3 or both esterification reactors 3, 8 flows out of the separating column 4 as process steam and is subdivided into two flows. One flow in steam feed line 38 is supplied as the driving flow to the steam jet pumps 30, 32, 33, 35, 37, 17, 17a, 19, 21. An additional heating means 39 can be provided for the steam feed line 38, which heats the process steam to temperatures above the boiling temperature, which increases the life of the driving steam nozzles of the jet pumps. The process steam condensed both in the jet pumps and the direct contact condensers of vacuum units 28, 29, 14 is collected in a barometric container 40 supplied by a pump 41 to a cooling tower 42, and in the latter the water is degassed and cooled. A pump 43 pumps the thus treated process water in return line 44 into the direct contact condensers 31, 34, 36, 18, 20 of vacuum units 28, 29, 14, where it is used for condensing the driving steam. The spraying, evaporation and sludge losses of cooling tower 42 are covered by the constantly newly produced process water from the process steam supplied by separating column 4. The excess process water is removed from the process at container 40.

A heat exchanger 46 is connected in line 45 of the second partial flow of the process steam leaving separating column 4. By means of said heat exchanger, a partial process water flow is supplied via a branch line 47 from circuit line 44, is heated to boiling point and is passed via flow regulating means 48 as a return flow into reaction column 4. Behind heat exchanger 46, a pressure regulating means 49 is connected in line 45 constant the pressure in reactor system 3, 4 and in the steam feed line 38 for the steam jet pumps. Residual steam and condensate pass out of heat exchanger 46 in line 45 and are introduced for total condensation purposes into one of the direct contact condensers of vacuum units 28, 29, 14 of vacuum reactors 9, 10, 11 or a separate direct contact condenser 50.

The use of process steam for vacuum production purposes presupposes that the gases sucked out of the vacuum reactors are free from impurities and, in particular, free from oligomers and glycol. Thus, upstream of the vacuum units are connected spray condensers 16 and/or separators, in which deposition takes place of the glycol vapours leaving vacuum reactors 9, 10, 11 which are enriched with such impurities. The entrainment of these substances into the vacuum unit then takes place merely in accordance with Raoult's law in saturated form through the very small sucked-off gas quantities. The ethylene glycol sprayed into the spray condensers via nozzles for the deposition of the glycol vapours leaving the vacuum reactors flows in the circuit at an appropriate temperature between 10° and 30° C. Spray condensers 16 can be followed by (not shown) oligomer separators, which can be equipped with a separating fabric. Ethylene glycol at a temperature between 10° and 30° C. is sprayed in over the fabric pieces and is removed at the lower end to a collecting container.

EXAMPLES

EXAMPLE 1

In an apparatus constructed according to FIG. 1, when 100 t/day of polyester was produced, a specific thermal consumption of 745 kW/1000 Kg of finished PETP was established.

EXAMPLE 2

In an apparatus constructed according to FIG. 2, when 100 t/day of polyester was produced, a specific thermal consumption of 595 kW/1000 Kg of finished PETP was established. Thus, by using the invention, it was possible to save roughly 20% primary energy. An approximately 45% process steam utilization is achieved in reaction column 3, 4.

EXAMPLE 3

In an apparatus constructed according to FIG. 1, when 100 t/day of polyester was produced, a specific cooling water consumption of 88 m³/1000 Kg of finished PETP was established.

EXAMPLE 4

In an apparatus constructed according to FIG. 2, when 100 t/day of polyester, a specific cooling water consumption of 42 m³/1000 Kg of finished PETP was established. Thus, by using the invention, it was possible to economize approximately 63% of the cooling water.

EXAMPLE 5

In an apparatus constructed according to FIG. 1, when 100 t/day of polyester was produced, a specific waste water quantity of 310 Kg/1000 Kg of finished PETP was established.

EXAMPLE 6

In an apparatus constructed according to FIG. 2, when 100 t/day of polyester was produced, a specific waste water quantity of 120 Kg/1000 Kg of finished PETP was established.

Thus, for approximately the same concentration of organic substances, by using the invention the waste water quantity was reduced by more than 60%.

Figure 3:
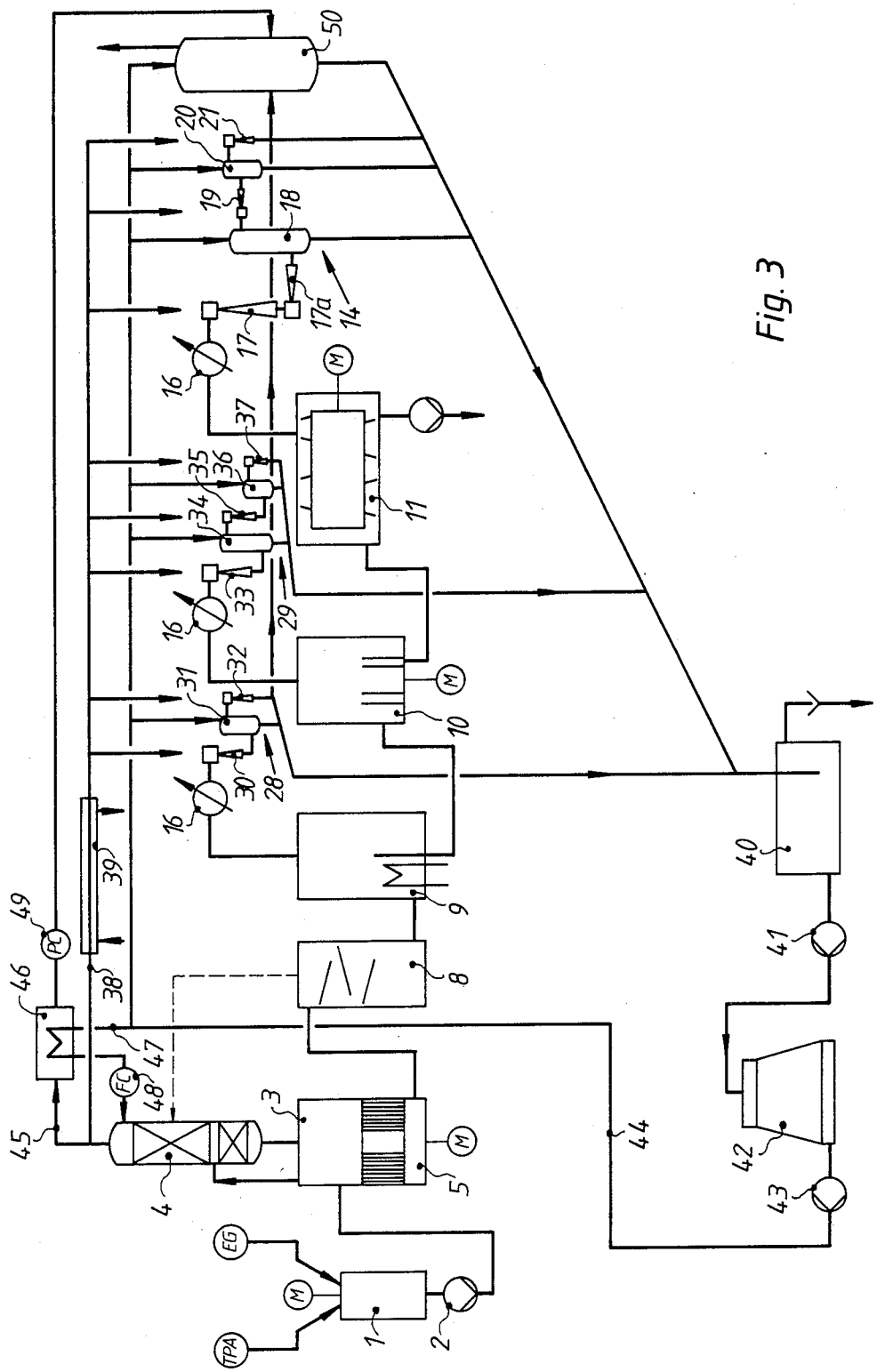
FIG. 3 represents another diagrammatic representation as a variant of FIG. 2.

Another apparatus is shown in FIG. 3, in which the residual vapours of the jet pumps 32, 37, 21 and the unused part of the process steam available downstream of the heat exchanger 46, are deposited and degassed in a direct contact condenser 50, the condensate again being supplied to the circuit via barometric container 40. The advantage of this construction is that as a result of the higher temperature in condenser 50 compared with cooling tower 42, the separation of gaseous or low-boiling constituents occurring during esterification and polycondensation is assisted and, consequently there is less pollution of the waste water system. A water/water heat exchanger can be used in this case in place of cooling tower 42.

I claim:

1. An improved process for the production of high molecular weight polyester, in which a pumpable paste is produced from, in particular, terephthalic acid and alkaline diol, esterified in a multi-stage reactor arrangement and subsequently polycondensated in vacuo in at least one vacuum reactor, the improvement characterized in that the vacuum for the at least one vacuum reactor is produced by means of waste heat generated from the reactor arrangement.

2. The process of claim 1 wherein the waste heat is supplied in the form of process steam as a driving flow to at least one jet vacuum unit producing the vacuum.

3. The process of claim 2 wherein the process steam serving as the driving flow is condensed in the at least one vacuum unit, the resulting condensed process water being supplied in a circuit as cooling water to the at least one vacuum unit for the condensation of the process steam.

4. The process of claim 3 wherein a partial circuit flow of the process water is heated and supplied as a return flow to the reactor arrangement.

5. The process of claim 4 wherein the process steam leaving the reactor arrangement is divided up into two partial flows, one partial flow heating up the partial circuit flow by means of a heat exchanger.

6. The process of claim 5 wherein the partially condensed process steam passing out of the heat exchanger is supplied to the at least one vacuum unit for total condensation.

7. The process of claim 5 wherein the vapors of the last jet vacuum unit are separately completely condensed and then degassed together with the process steam residues and returned to the process water circuit.

8. The process of claim 6 wherein the process water condensate leaving the vacuum unit is collected in a barometric container and, by means of a cooling tower, is degassed and cooled.

9. The process of claim 2 wherein the process steam is heated to temperatures above the boiling point thereof.

* * * * *